(12) United States Patent
Tellado et al.

(10) Patent No.: US 7,646,699 B2
(45) Date of Patent: Jan. 12, 2010

(54) TRANSCEIVER POWER BACKOFF

(75) Inventors: Jose Tellado, Mountain View, CA (US); Sanjay Kasturia, Palo Alto, CA (US)

(73) Assignee: Teranetics, Inc., Santa Clara, CA (US)

( * ) Notice: Subject to any disclaimer, the term of this patent is extended or adjusted under 35 U.S.C. 154(b) by 631 days.

(21) Appl. No.: 11/303,364

(22) Filed: Dec. 16, 2005

(65) Prior Publication Data

US 2007/0140289 A1    Jun. 21, 2007

(51) Int. Cl.
*H04J 1/12* (2006.01)
(52) U.S. Cl. .................. 370/201; 370/282; 370/445
(58) Field of Classification Search .............. None
See application file for complete search history.

(56) References Cited

U.S. PATENT DOCUMENTS

| | | | |
|---|---|---|---|
| 6,377,640 B2 * | 4/2002 | Trans | 375/354 |
| 6,532,277 B2 | 3/2003 | Ulanskas et al. | |
| 6,922,448 B1 | 7/2005 | Jacobsen et al. | |
| 2003/0099350 A1 | 5/2003 | Bostoen et al. | |
| 2004/0095921 A1 | 5/2004 | Kerpez | |
| 2004/0114503 A1 | 6/2004 | Schneider et al. | |
| 2005/0245216 A1 | 11/2005 | Boos | |
| 2006/0153106 A1* | 7/2006 | Laakso et al. | 370/282 |

FOREIGN PATENT DOCUMENTS

WO    WO 00/21204    4/2000

OTHER PUBLICATIONS

Zimmerman et al, Power Backoff, IEEE, 12 pages, Feb. 2005.*
Zimmerman et al, Power Backoff, IEEE, 16 pages, Mar. 2005.*

* cited by examiner

*Primary Examiner*—Frank Duong
(74) *Attorney, Agent, or Firm*—Brian R Short (57) ABSTRACT

A device and method of setting transmit power backoff of a transceiver within a network is disclosed. The method includes estimating a channel loss of a channel of the transceiver, obtaining channel loss information, the channel loss information including estimates of channel loss of other channels of the network, obtaining crosstalk information, the crosstalk information including estimates of crosstalk between the channel and other channels of the network, and setting the power backoff based on the channel loss of the channel, the channel information, and the crosstalk information.

36 Claims, 6 Drawing Sheets

Unshielded Cat6/ClassE
Max length of 55m
Worst Case Installation

| Length (m) | Min. Power Back Off |
|---|---|
| [0,15] | 8 |
| (15,25] | 6 |
| (25,35] | 4 |
| (35,45] | 2 |
| (45,55] | 0 |

FIGURE 4A

Unshielded Cat6/ClassE
Nominal Tx Power = 4dBm
Max Loss 8db (~75m)
External Crosstalk 10 dB below limit (Loose Bundling installation or channel margin)

| Received Signal (dBm) | Min. Power Back Off |
|---|---|
| > -1.1 | 10 |
| (-2.3, -1.1] | 8 |
| (-3.3, -2.3] | 6 |
| (-4.2, -3.3] | 4 |
| (-5.0, -4.2] | 2 |

FIGURE 4B

Cat6A/ClassEa
Nominal Tx Power = 4dBm
Max Loss 14dB (~100m)
Worst Case Installation

| Received Signal (dBm) | Effective Length | Min. Power Back Off |
|---|---|---|
| > -1.1 | < 35 | 10 |
| (-2.3, -1.1] | [35,45] | 8 |
| (-3.3, -2.3] | (45,55] | 6 |
| (-4.2, -3.3] | (55,65] | 4 |
| (-5.0, -4.2] | (65,75] | 2 |
| <= -5.0 | > 75 | 0 |

FIGURE 4C

Cat7/ClassF (Shielded)
Nominal Tx Power = 4dBm
Any Channel Length
All Installations

| Length (m) | Min. Power Back Off |
|---|---|
| (0,33] | 0 |
| (33,66] | 0 |
| (66,100] | 0 |
| > 100 | 0 |

TRANSCEIVER POWER BACKOFF

FIELD OF THE INVENTION

The invention relates generally to communication systems. More particularly, the invention relates to setting transceiver power backoff.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

Figure 1:
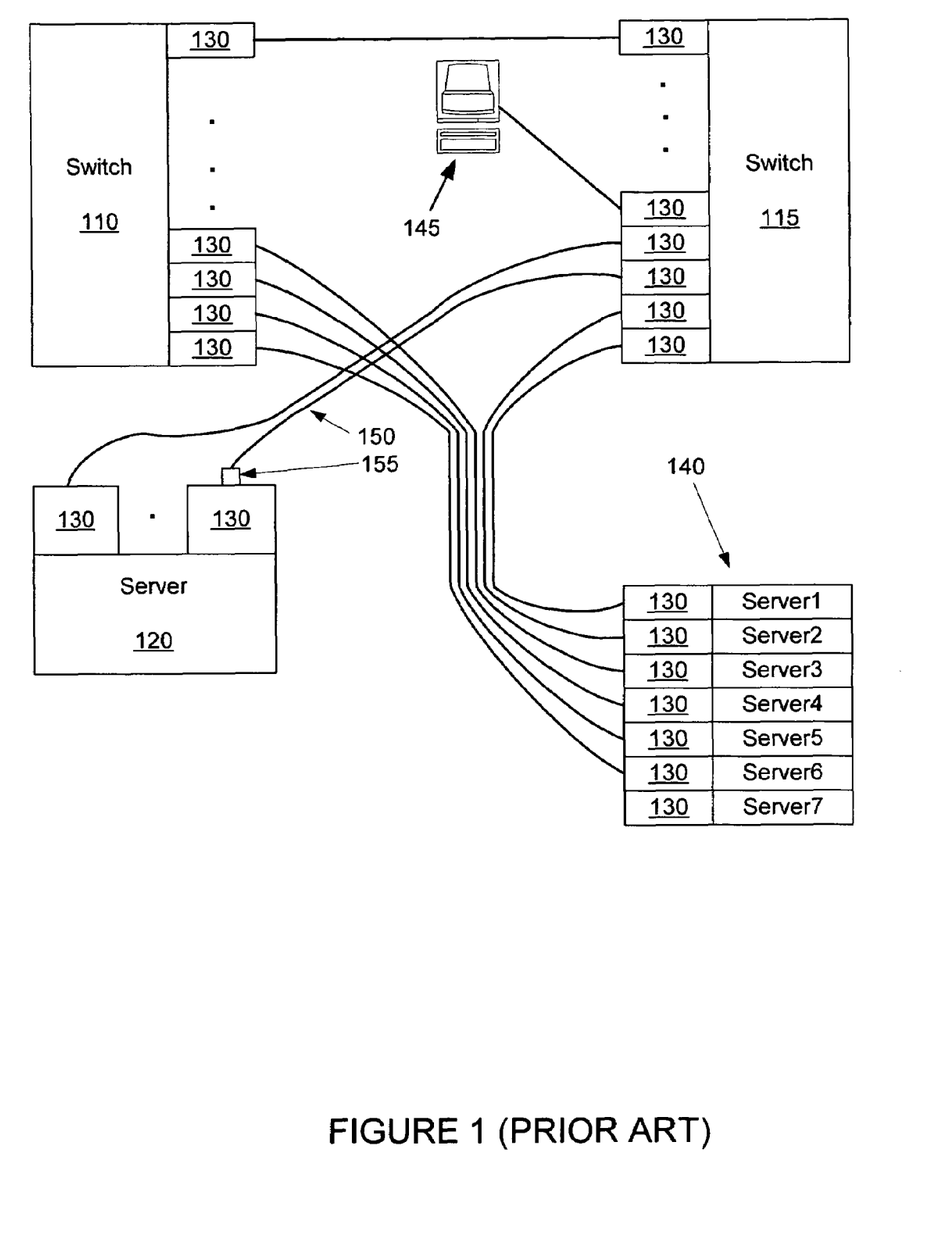
FIG. 1 shows a network of wired devices that suffer from cross talk between cables and connectors between the devices.

FIG. 1 shows a block diagram of an Ethernet system. This system includes switches 110, 115, a server 120, a set of blade servers 140, and a personal computer 145. Each of the Ethernet devices 110, 115, 120, 140 includes Ethernet transceivers 130 which enable transmission of Ethernet signals between the devices 110, 115, 120, 140. The signal transmission is over Ethernet transmission channels that are provided by cables and connectors, such as cable 150 and connector 155.

Cables and connectors located proximate to each other can suffer from coupling of signals from one cable and connector to another cable and connector. The coupling is referred to as crosstalk, and is undesirable because crosstalk signals can interfere with intended transmission signals. Crosstalk signals become more prominent as transmission frequencies increase in transmission frequency. Therefore, as Ethernet system progress to 10GBASE-T, crosstalk signals become a greater problem.

One way to reduce the effects of crosstalk is to reduce the signal level of transmission signals. Lower amplitude transmission signals result in lower amplitude crosstalk, and therefore, cause less interference. However, transmission signal amplitude reduction can cause other problems. The transmission can be made unreliable by reducing the transmission signal amplitude because the SNR (signal to noise ratio) is typically decreased.

One proposed method of reducing transmission signal amplitude to minimize crosstalk is to determine the worst case crosstalk within a network. The signal amplitude of all transmitters within the network is reduced until the worst case crosstalk meets a predetermined threshold. The amplitudes of transmission signals of the entire network are reduced to the worst case, to ensure that the crosstalk of the entire network meets the crosstalk threshold. This solution is inefficient, however, because the transmission channels (cables) of most of the network can have much greater transmission signal amplitudes without causing crosstalk problems. As a result, data transmission within the system suffers excessively.

It is desirable to have a system, apparatus and method of adjusting transmission signal amplitudes (power backoff) of transmitters of a network to provide a desired level of crosstalk within the network. The power backoff is desirably adjusted to allow the transmission signal amplitude to be as great as possible while still meeting the desired crosstalk threshold.

SUMMARY OF THE INVENTION

An embodiment of the invention includes a method of setting transmit power backoff of a transceiver within a network. The method includes estimating a channel loss of a channel of the transceiver, obtaining channel loss information, the channel loss information including estimates of channel loss of other channels of the network, obtaining crosstalk information, the crosstalk information including estimates of crosstalk between the channel and other channels of the network, and setting the power backoff based on the channel loss of the channel, the channel information, and the crosstalk information.

Another embodiment includes a transceiver within a network. The transceiver includes a transmission channel, means for obtaining crosstalk information between the channel and other channels of the network, means for estimating channel loss of the channel, means for obtaining channel loss information for other channels of the network, and means for setting a power backoff for the channel based upon a the channel loss of the channel, the channel loss information of the other channels and the crosstalk information.

Other aspects and advantages of the present invention will become apparent from the following detailed description, taken in conjunction with the accompanying drawings, illustrating by way of example the principles of the invention.

DETAILED DESCRIPTION

The invention includes an apparatus and method for setting power backoff of a transceiver within a network. The power backoff can be adjusted to improve crosstalk between channels of the network based upon several network characteristics, such as, transmission channel lengths, transmission channel cables and connector types and configurations, network installation procedures, and measured crosstalk.

It is to be appreciated that the present teaching is by way of example, not by limitation. Therefore, although the embodiments described herein are for convenience of explanation, it is to be appreciated that the principles herein may be applied equally to other configurations of transmitter power backoff methods.

Figure 2:
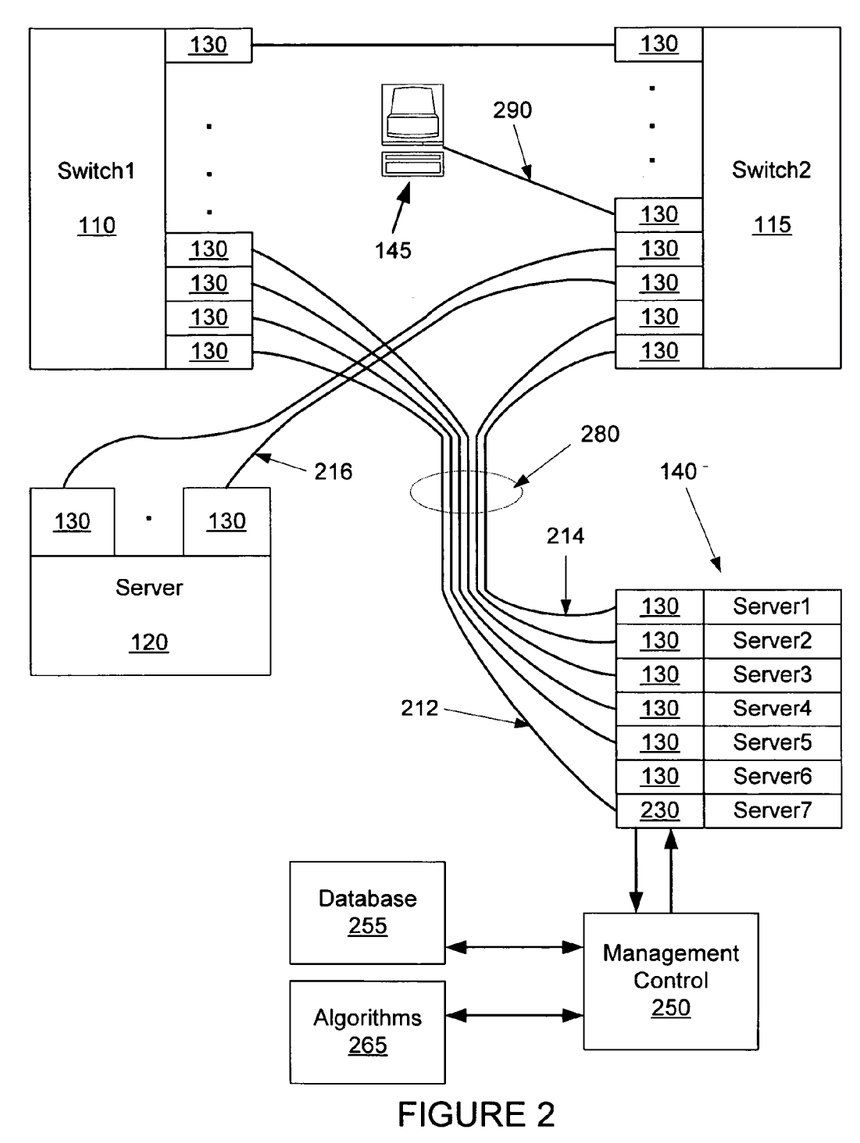
FIG. 2 shows a network of wired devices that can benefit from exemplary embodiments setting power backoff.

FIG. 2 shows a network of wired devices that can benefit from exemplary embodiments for setting power backoff. This embodiment includes a management controller 250 that receives information about transceiver 230, and information about the network around the transceiver 230, and sets the power backoff of, for example, the transceiver 230 based upon at least some of the available information. The transceiver 230 has been shown to be controlled by the controller 250 as an example. Any of the other transceivers 130 can be controlled by the controller 250 as well, or be other equivalent controllers.

The devices 110, 115, 120, 140, 145 of the network are connected through transmission channels, such as, transmission channels 212, 214, 216, 290. The channels (which typically include cables and connectors) include channels of many different lengths. Bundling short and long channels together (such as bundle 280) typically causes transmitters connected to short channels to interfere (referred to as alien crosstalk) with receivers connected to long channels. Multiple transceivers operating on bundled (such as the bundle of cables 280) or neighboring (and therefore, mutually interfering) channels may or may not be co-located. Typically, the worst case alien crosstalk situations occur when a transceiver (alien disturber) operating on a short channel has its transmitter very close to a receiver (alien victim) of another transceiver operating on a long channel. In this situation, the desired signal of the receiver can be very weak due to the long channel (due to attenuation of the long channel), but the alien signal can be strong (due to not much attenuation because of the short channel), resulting in a low (desired) signal to (alien) crosstalk ratio. The low signal to crosstalk ratio typically results in an unreliable link, requiring the transceiver of the short channel to reduce (power backoff) the transmitted signal power. This can be possible with the short channel because the short channel typically experiences less attenuation during transmission. That is, the receiver of the short channel can typically operate properly because the power backoff is not great enough to impede operation. However, with the high operating frequencies of 10GBASE-T, crosstalk can require the power backoff to be prohibitively great, resulting in operating margins of short channel being too small, which can cause short channels to be unreliable.

The management controller controls the power backoff of the transmitter of the transceivers (such as transceiver 230) to reduce the effects of crosstalk, while still ensuring enough transmission power to provide reliable transmission. The management controller 250 can be located within the transceiver 230. However, that is not essential. The controller 230 can be located elsewhere, or can be distributed over several different locations. One exemplary embodiment includes the management controller being shared over the full network and being connected to several transceivers 130. Another exemplary embodiment includes there being two types of controllers, one type for controlling the overall network and another type located within each individual transceiver, for controlling the transceiver.

As stated, the operation of the controller 250 includes setting transmit power backoff of the transceiver 230. An exemplary embodiment of setting the transmit power backoff includes estimating a channel loss of a channel 212 of the transceiver 230. The controller 250 obtains channel loss information that includes estimates of channel loss of other channels (for example, channels 214, 216, 290 and others not designated) of the network. The controller 250 obtains crosstalk information that includes estimates of crosstalk between the channel 212 and other channels of the network. The controller sets the power backoff based on the channel loss of the channel 212, the channel information, and the crosstalk information.

The controller 250 can include a database 255 and/or algorithms 265. The database can include such things as power backoff look up tables (as will be described), cable type information, and system operator input information. The algorithms 265 can provide the controller with power backoff estimates based upon the network characteristics. Exemplary algorithms will be provided.

For another exemplary embodiment, the controller used channel length rather than channel loss to set the transmit power backoff. Generally, channel loss and channel length are closely related, but one of the two channel characteristics may be easier to obtain. This embodiment of setting the transmit power backoff includes estimating a channel length of a channel 212 of the transceiver 230. The controller 250 obtains channel length information that includes estimates of channel length of other channels of the network. The controller 250 obtains crosstalk information that includes estimates of crosstalk between the channel 212 and other channels of the network. The controller sets the power backoff based on the channel length of the channel, the channel information, and the crosstalk information.

Network

The network includes the interconnection of devices that are connected through channels (that typically include cables and connectors) that are in close proximity so that signals passing through the channels couple from one channel to other channels. The coupling from one channel to another channel is crosstalk, which adjusting the power backoff of the transmission signals attempts to reduce. The term network refers to devices and channels of the devices associated with a transmitter or transceiver that are adversely effected (by crosstalk) by transmission signals of the transmitter or transceiver, and can benefit from power backoff control of the transmitter or transceiver.

Channels

The channels between devices are described generically. However, exemplary channels include wired connections, and more specifically, wired twisted pairs of copper wires as used by Ethernet systems. A channel of an Ethernet system can include four pairs of twisted copper wires plus connectors. The connectors may terminate at a device, or connect one set of twisted pairs with another set of twisted pairs (for example, at an Ethernet wall jack or panel).

Channel Length Determination

There are many possible methods for a transmitter to determine the length of its channel. The method can be as simple as a system operator entering an approximate length, which is referred to later. Another method includes timing transmission time through the channel, and estimating the channel length based on the transmission time. The estimate can require knowledge of the channel type because, for example, different cable types can have different propagation speeds. The channel length is typically related to the channel loss or insertion loss through the channel. Channel loss is typically used to determine the desired power backoff of transmission signals.

Channel Loss Information

The channel loss information typically includes the channel loss of all other channels of the network. The channel loss represents the difference in transmitted signal power, and received signal power after the signal has passed through a transmission channel. As previously described, the channel loss information can generally be approximated by the channel length information. The channel length of each channel can be determined as previously described, by timing the transmission of signals through the channels. The cable length can be approximated by a system operator, and made available to the management controller 250.

Crosstalk Information

Again, there are typically many different methods of determining the crosstalk associated with a transmission channel. The crosstalk between channels can be measured, or the crosstalk can be approximated by knowing the types of cable and connectors used, the method of installing the cables and connectors (that is, loosely or tightly bundled), the density (number of cables per bundle or per area) and the closest proximity of the cables or connectors to each other. A system operator can enter crosstalk estimate into the database 255.

Figure 3A:
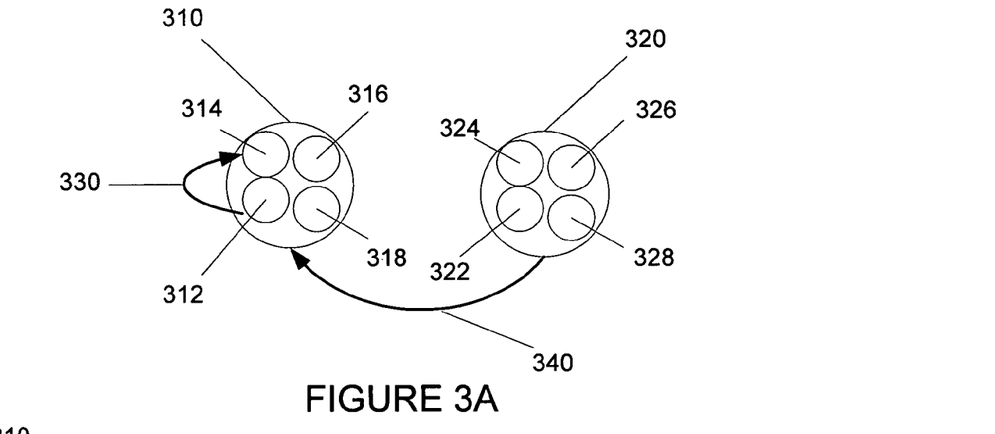
FIGS. 3A, 3B, 3C show configurations of cables that suffer from varying degrees of crosstalk between the cables.
Figure 3B:
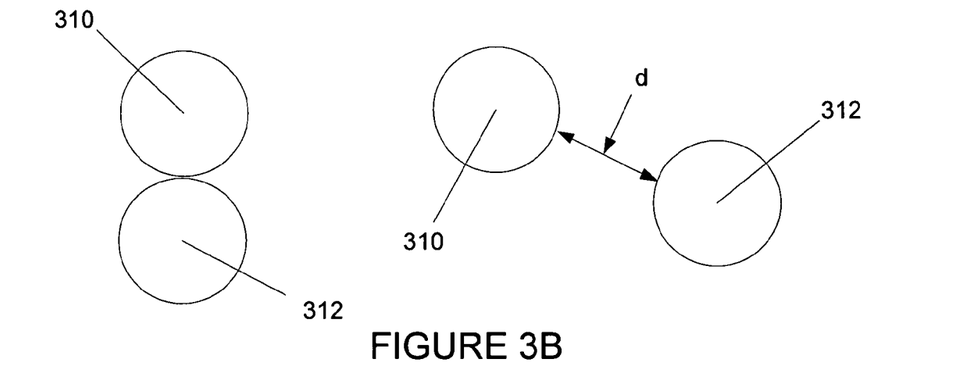
Figure 3C:
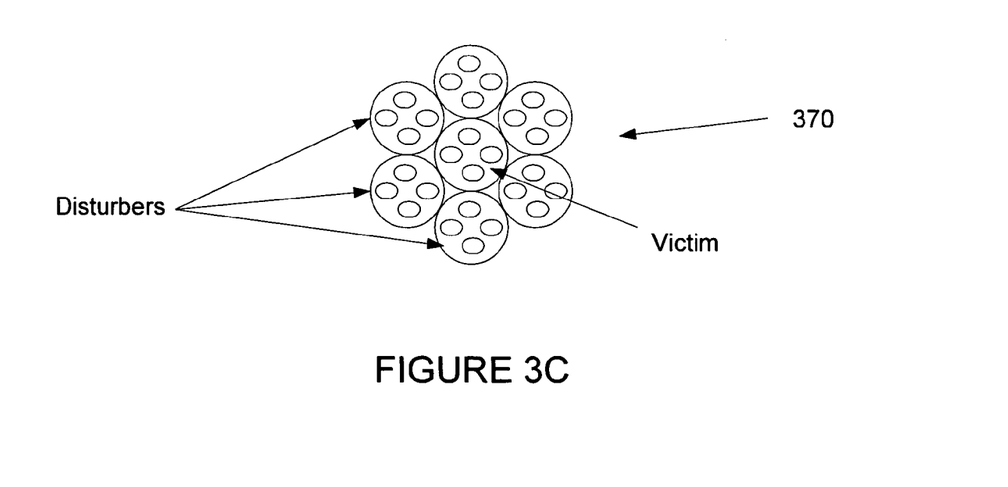

FIGS. 3A, 3B, 3C show configurations of cables that suffer from varying degrees of crosstalk. FIG. 3A shows two cables 310, 320 that include internal cables. The first cable 310 includes internal cables 312, 314, 316, 318. The second cable 320 includes internal cables 322, 224, 326, 328. Each of the internal cables 312, 314, 316, 318, 322, 324, 326, 328 can include copper twisted pairs of wires. The crosstalk is greatly influenced by the cable type. The cable type can be input to the database 255 by a system operator. The controller 250 can additionally use this information in setting the power backoff.

External Crosstalk

As shown in FIG. 3A, external crosstalk between the first cable 310 and the second cable 320 is shown by the line 340. The external crosstalk can vary depending upon the type of cables used. Additionally, as shown in FIG. 3B, the external crosstalk can vary depending upon a distance d between the cables. FIG. 3B shows the cables 310, 320 touching, and the cables 310, 320 having a distance d between them. Assuming the same type of cables are used for the two different situations, typically the first (the cables touching) will suffer from the greater external crosstalk.

The distance between cables and the orientation of the cables (and therefore, the crosstalk) is greatly influenced by the installation procedures. The installation procedure can be input to the database 255 by a system operator. The controller 250 can additionally use this information in setting the power backoff.

Internal Crosstalk

Also shown in FIG. 3A, the cables 310, 320 experience internal crosstalk. Internal crosstalk is crosstalk between internal cables as shown by line 330. An Ethernet transceiver connected to cable 310 or 320 is typically connected to all four internal cable pairs, and can easily estimate the level of internal crosstalk. Measurements of the internal crosstalk can be used to estimate characteristics of the external crosstalk. The distance between internal cables is typically lower than the distance between external pairs. Therefore, the internal crosstalk is typically greater. If the internal crosstalk is very small, it can generally be assumed that the external crosstalk is very small. For example, a class F Ethernet cable has individual shielding of each cable pair which results in very small internal and external crosstalk. Alternatively, the four cable pairs within another Ethernet cable can include a different twist ratio to reduce the internal crosstalk. However, the different twist ratio can increase the external coupling between an unscreened cable pair having the same twist ratio. As previously described, both the internal and external crosstalk can very greatly depending upon the types of cables used.

The internal crosstalk can generally be more easily determined by a transceiver than external crosstalk. As shown in FIG. 2, the channel 212 is connected to the transceiver 230. An embodiment of the channel 212 includes the internal channels as previously described. The transceiver 230 can drive the channel 212 with known signals, having known signal amplitudes. The internal crosstalk can be determined by measuring the signals resulting from coupling between the internal cables. That is, the input signals to the channel 212 are known by the transceiver 230. The internal crosstalk can be determined by measuring the response of the internal channels to the known input signals.

FIG. 3C shows a common configuration used to determine the worst case external crosstalk. This configuration is typically referred to as a six around one configuration 370. This configuration includes six disturbing cables surrounding one internal victim cable. The victim cable located at the center of the configuration 370 typically includes the worst cased external crosstalk. Each one of the seven cables is a channel that includes four twisted copper pairs.

LUT Determination of Power Backoff

An exemplary embodiment includes determining power backoff by referencing LUTs that provide a power backoff value based upon channel losses (or cable length) of channels of the network. Additionally, other channels characteristics can be used such as channel cable types and cable deployment architectures.

Figure 4A:
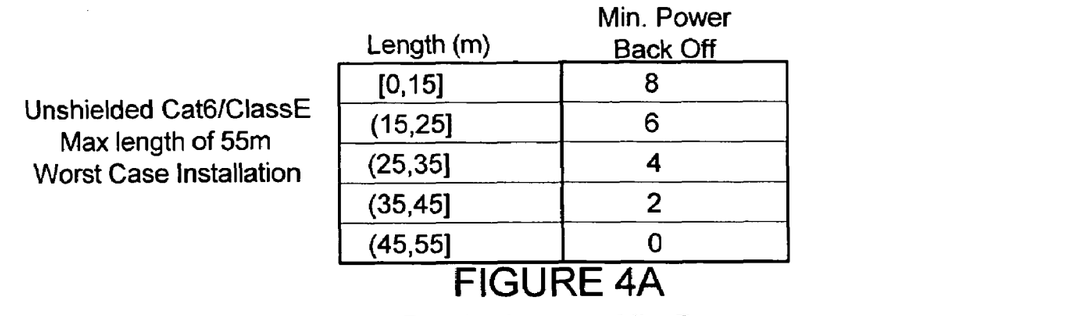
FIGS. 4A, 4B, 4C, 4D shows look up tables (LUTs) that provide suggested values of power backoff for various cable lengths and cable types.
Figure 4B:
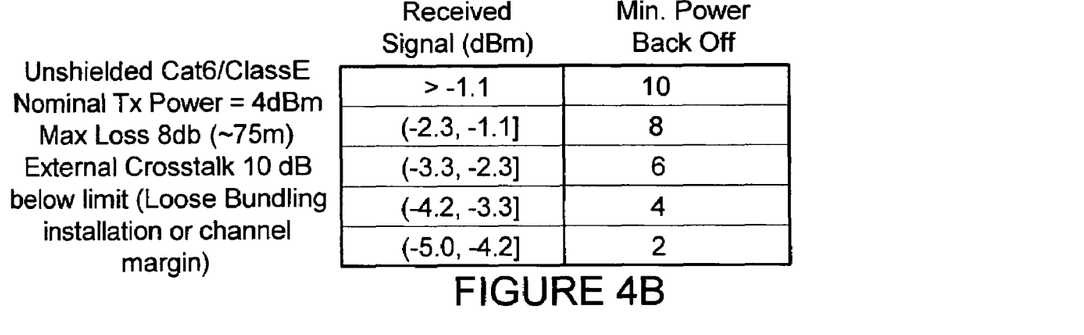
Figure 4C:
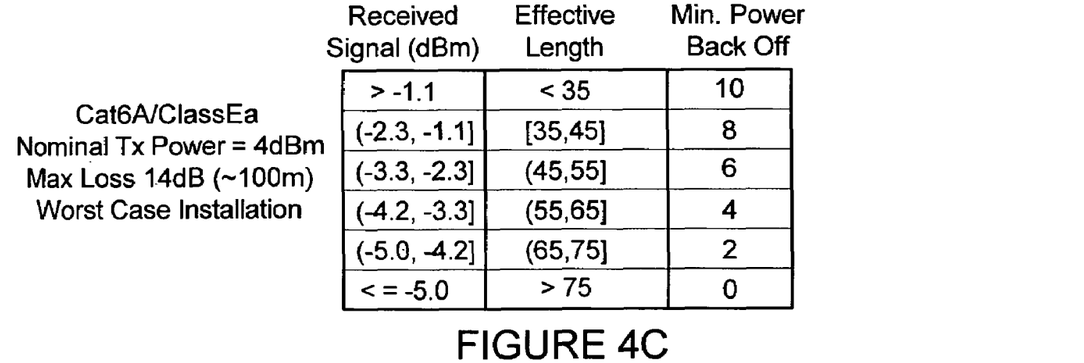
Figure 4D:
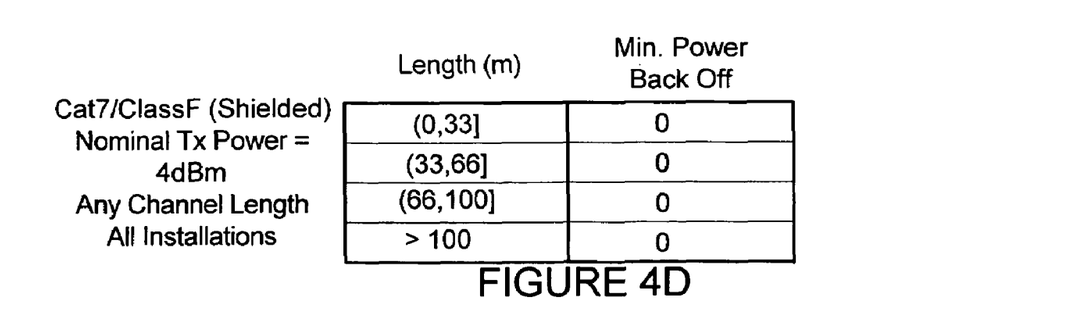

FIGS. 4A, 4B, 4C, 4D shows look up tables (LUTs) that provide suggested values of power backoff for various cable lengths and cable types. These are merely examples of back-off values. Clearly, other LUTs and suggested values can be used. The first exemplary table of FIG. 4A is for an unshielded CAT6 cable, having a maximum channel length of 55 meters, and assuming the worst case installation. A power backoff value is provided for various ranges of lengths of the channels. The second exemplary table of FIG. 4B is for an unshielded CAT6A cable, having a nominal transmit power of 4 dBm, a maximum channel loss of 8 dB (which corresponds to a cable length of approximately 75 meters, external crosstalk that is 10 dB below the worst case specification limits (that is, a design margin of 10 dB). A power backoff value is provided for various ranges of received signal power. The third exemplary table of FIG. 4C is for a CAT6A cable, assuming nominal transmit power of 4 dBm, having a maximum loss of 14 dB (which corresponds to a cable length of approximately 100 meters), assuming the worst cased installation. Power backoff values are provided for ranges of received signal power, and ranges of channel length. The fourth exemplary table of FIG. 4D is for a CAT7 cable, assuming a nominal transmit power of 4 dBm, with any channel length and for any installation. Power backoff values are provided for various ranges of channel length.

As previously discussed, crosstalk measurements can be made to provide better power backoff determinations. The crosstalk measurements can be used to adaptively update the LUTs to provide better power backoff determinations.

Frequency Domain Influences

The channel loss (insertion loss) through the channels and the crosstalk between channels typically varies with frequency. Therefore, the frequency response of the insertion loss or crosstalk of the channels can additionally be used to determine the power backoff. One embodiment uses a mean or median value of a frequency response of the insertion loss, or the insertion loss at a middle frequency of a transmission signal frequency band of interest to estimate the channel loss for each channel. Similarly, another exemplary embodiment uses a mean or median value of the crosstalk frequency response, or the crosstalk at a middle frequency of the transmission signal frequency band of interest to estimate the crosstalk for each channel. Another exemplary embodiment uses an estimate of the mean or median channel loss to crosstalk ratio, or channel loss to crosstalk ratio at a middle frequency of the transmission signal frequency band of interest. This can include just estimating the loss of the channel associated with the transceiver, as well as estimating the loss of all other channels of the network as well.

The power backoff can be frequency dependent because the crosstalk between channels can be different at different frequencies. Therefore, the desired power backoff can be different for different transmission frequencies. Due to the frequency dependence of the power back off, an embodiment includes selecting one of plurality of power backoff settings in which each power backoff setting has a different power spectral density. Another embodiment includes selecting one of plurality of power backoff settings, wherein each power backoff setting includes a plurality of different settings for a plurality of different transmitter frequencies. The previously described LUTs can additionally include frequency dependent power backoffs.

Figure 5:
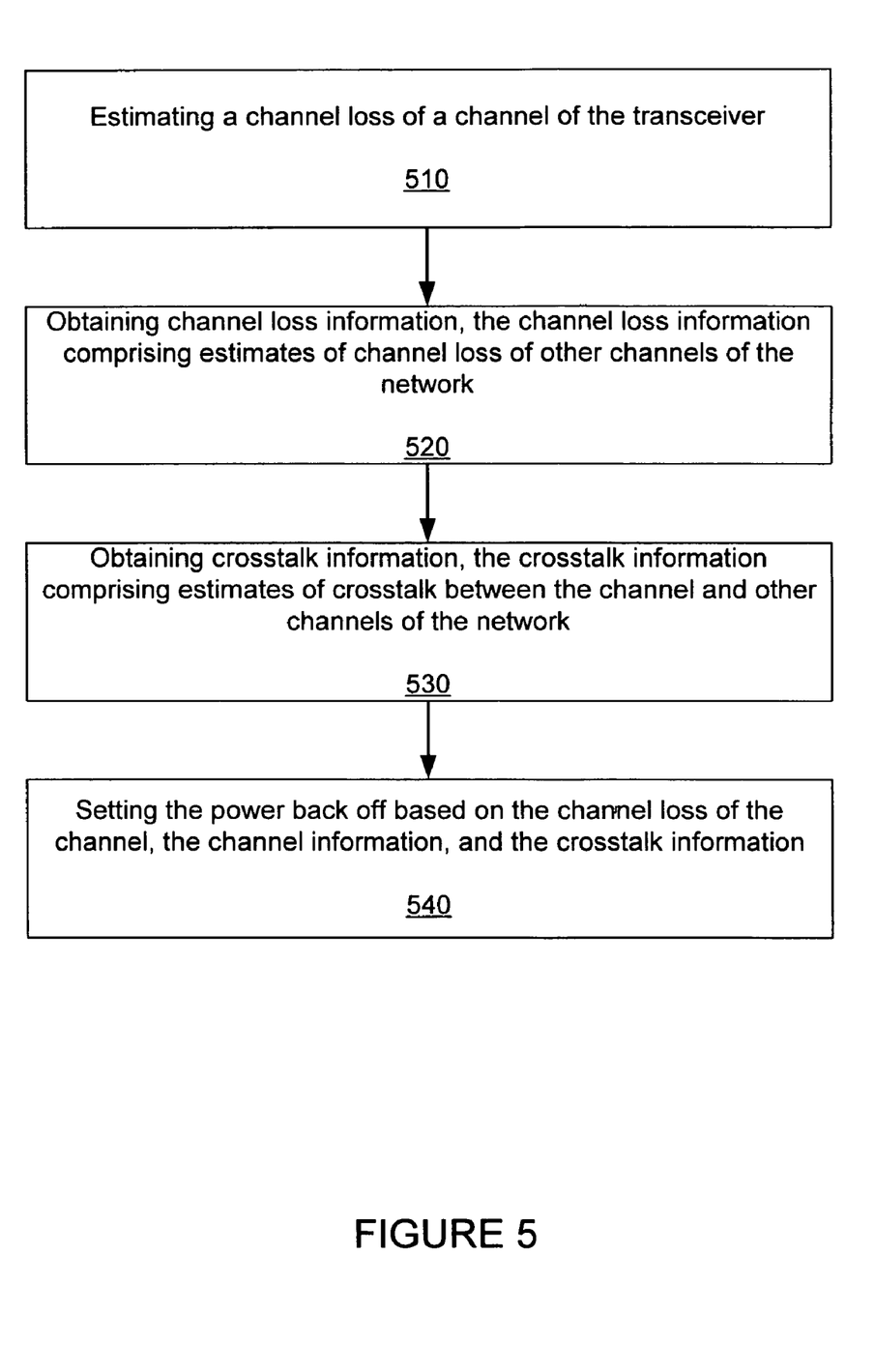
FIG. 5 shows a flow chart that includes an exemplary method of setting power backoff.

FIG. 5 shows a flow chart that includes an exemplary method of setting power backoff. A first step 510 includes estimating a channel loss of a channel of the transceiver. A second step 520 includes obtaining channel loss information, the channel loss information comprising estimates of channel loss of other channels of the network. A third step 530 includes obtaining crosstalk information, the crosstalk information comprising estimates of crosstalk between the channel and other channels of the network. A fourth step 540 includes setting the power backoff based on the channel loss of the channel, the channel information, and the crosstalk information.

Figure 6:
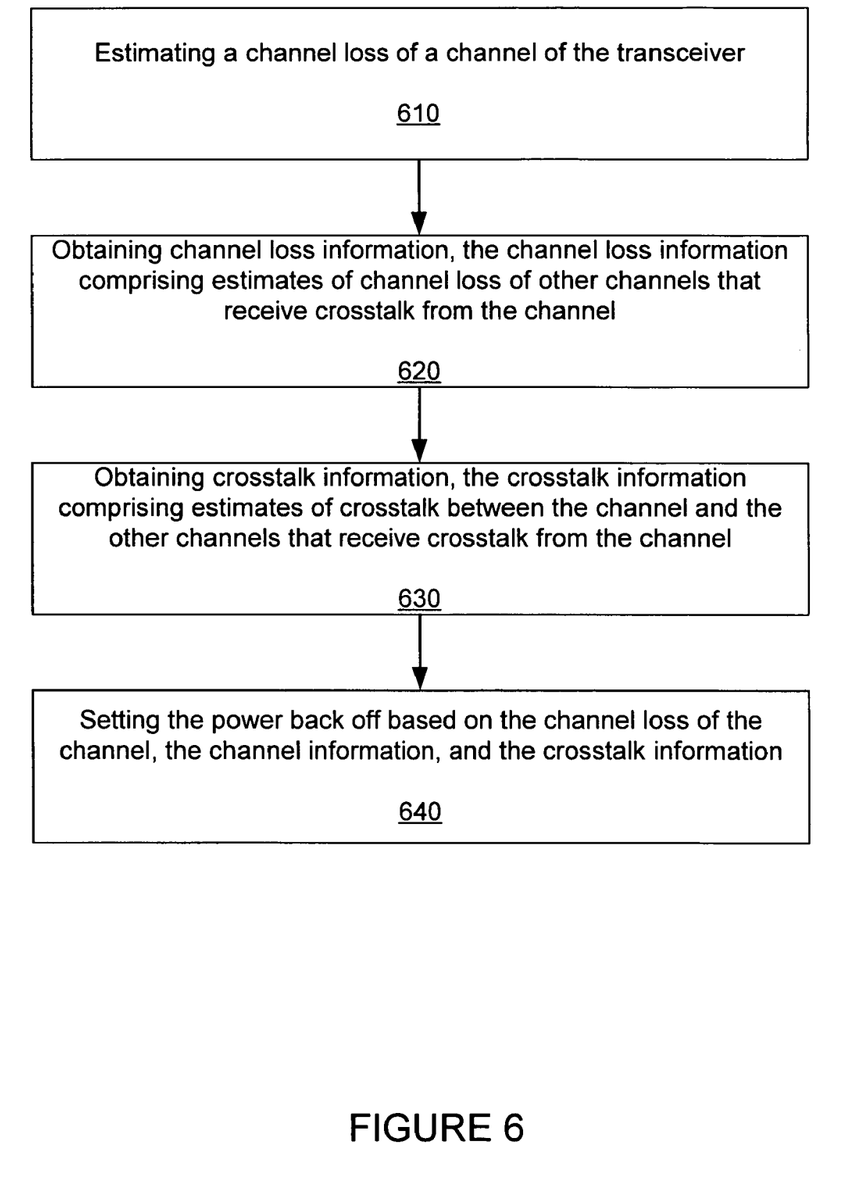
FIG. 6 shows a flow chart that includes another exemplary method of setting power backoff.

FIG. 6 shows a flow chart that include an exemplary method of setting power backoff. A first step 610 includes estimating a channel loss of a channel of the transceiver. A second step 620 includes obtaining channel loss information, the channel loss information comprising estimates of channel loss of other channels that receive crosstalk from the channel. The second step 620 can alternatively include obtaining channel loss information, the channel loss information comprising estimates of channel loss of other channels that channel receives crosstalk from. A third step 630 includes obtaining crosstalk information, the crosstalk information comprising estimates of crosstalk between the channel and the other channels that receive crosstalk from the channel. A fourth step 640 includes setting the power backoff based on the channel loss of the channel, the channel information, and the crosstalk information.

Algorithmic Determination of Power Backoff

For the following discussion, $S(f)$ represents the power spectral density of a desired transmitted signal, $IL(f)$ represents the linear magnitude squared of the frequency domain channel loss or insertion loss, $T(f)$ represents the power spectral density of the external cross talk at a victim receiver and $N(f)$ represents a received power spectral density of all other noise sources at the victim receiver. An estimate of the achievable SNR over a transmission channel can be given by:

$$\text{Mean}\{10^*\log 10(1+S(f)/IL(f)/(T(f)+N(f)))\}$$

For moderate to good channels the second term in the Log summation is >>1, so the '1' can be ignored. Thus, the SNR can be estimated by:

$$10^*\log 10(1+S(f)/IL(f)/(T(f)+N(f)))\sim 10^*\log 10(S(f)/IL(f)/(T(f)+N(f)))$$

Using properties of logarithms results in:

$$10^*\log 10(S(f)^*IL(f)/(T(f)+N(f))=10^*\log 10(S(f))-10^*\log 10(IL(f))-10^*\log 10(T(f)+N(F))$$

If the power backoff frequency response is represented by a variable power backoff(f), the achievable SNR of the channel can be given by:

$$\text{Mean}\{10^*\log 10(S(f))-10^*\log 10(\text{power\_backoff}(f))-10^*\log 10(IL(f))-10^*\log(T(f)+N(f))\}$$

Assuming power backoff is constant across frequency (power_backoff(f)=power_backoff), and denoting POWER_BACKOFF=−10*log 10(power_backoff), and denoting Mean{10*log 10(S(f))} as SdBtx, this simplifies to:

$$\text{SdBtx}-\text{POWER\_BACKOFF}-\text{Mean}\{10^*\log 10(IL(f))\}-\text{Mean}\{10^*\log(T(f)+N(f))\}$$

Insertion Loss

For the expression above, Mean{10*log 10(IL(f))} is the mean log channel loss. Assuming the crosstalk T(f) remains constant and the receiver is ideally implemented, if the mean log channel loss improves (less loss) by N dBs, the power backoff can increase (more power backoff) by N dBs, without reducing the overall achievable SNR. Therefore, a simple algorithm for selecting power backoff is to set power backoff to 0 dB for the channel with maximum mean log channel loss and increase the power backoff by 1 dB for each 1 dB of mean log channel loss-improvement relative to the maximum channel loss. In reality, it is desirable that transceivers connected to channels with less mean log loss have better performance and additional margin, and have the power backoff increase slower than the improvement of channel loss. For example, the transceivers can increase the power backoff by 1 dB for every 2 dB of mean log channel loss improvement. Since 10*log 10(IL(f)) is typically a smooth monotonically decreasing function, the estimation of Mean{10*log 10(IL(f))} can be simplified by estimating 10*log 10(IL(Fo)), where Fo is some representative frequency, typically approximately in the middle of the frequency band of interest. For 10GBase-T, the most significant band is 0-400 MHz, and the middle frequency region of interest is in the range 150 MHz to 250 MHz.

Crosstalk

The above derivation can be repeated for estimating T(f). Assuming T(f)>>N(f) (that is, crosstalk is the dominating received impairment). Then the achievable SNR is reduced by Mean{10*log 10(T(f))}, that is, the mean log crosstalk. Thus for this case for every 1 dB improvement of mean log crosstalk (for example a channel type that as 1 dB of margin on the specification), the power backoff can be decreased by 1 dB. Assuming the mean log crosstalk can be approximated as a relatively smooth and monotonic function (this is usually the case), T(Fo) can be estimated at some approximately middle frequency.

The insertion loss and crosstalk derivations can be jointly utilized by defining mean log channel loss plus external cross talk parameter as:

$$\text{Mean}\{10^*\log 10(IL(f))\}+\text{Mean}\{10^*\log 10(T(f))\}.$$

For this case, when the sum improves (decreases) by 1 dB (due to less loss or less crosstalk) allows an increase in the power backoff by 1 dB.

Power backoff levels and computing the exact values for power backoff can be much more complicated and require additional post-processing.

Shielded Channels

Shielded channels can include a metal mesh or conductor wrapped around individual twisted pairs. For these configurations the crosstalk can be shielded enough that no power backoff is required. For example, FIG. 4D shows a Cat7, ClassF cable that may not require any power back off. For this configurations, transmit power backoff of a transceiver can be set based on crosstalk information, wherein the crosstalk information can include estimates of crosstalk between the channel and other channels of the network, and information regarding channel shielding.

Although specific embodiments of the invention have been described and illustrated, the invention is not to be limited to the specific forms or arrangements of parts so described and illustrated. The invention is limited only by the appended claims.

What is claimed:

1. A method of setting transmit power backoff of a transceiver within a network, comprising:
   estimating a channel loss of a channel of the transceiver;
   obtaining channel loss information, the channel loss information comprising estimates of channel loss of other channels of the network;
   obtaining crosstalk information, the crosstalk information comprising estimates of crosstalk between the channel and other channels of the network;
   setting the power backoff based on the channel loss of the channel, the crosstalk information, and a maximum channel loss of channel losses of the other channels of the network, wherein setting the power backoff additionally includes factoring a type of channel used to provide each of the channels of the network, the type of channel comprising at least one of a cable type and a connector type, and factoring a procedure for installing of each of the channels of the network, wherein separate LUTs are provided for each of a plurality types of channels of the network, and separate LUTs are provided for each of a plurality types of installation procedures of the network.

2. The method of claim 1, wherein setting the power backoff for the channel further comprises:
   setting the power backoff based on a range of channel losses of the other channels of the network.

3. The method of claim 1, wherein the lengths of the channels are automatically measured.

4. The method of claim 1, wherein setting the power backoff for the channel further comprises:
   setting the power backoff based on a maximum channel loss and a minimum channel loss of the other channel losses of the other channels of the network.

5. The method of claim 1, wherein the channel loss of each channel is determined from a length of each channel.

6. The method of claim 3, wherein the lengths of the channels are measured by timing transmission through the channels.

7. The method of claim 1, wherein setting the power backoff comprises selecting one of plurality of power backoff settings, each power backoff setting including a plurality of different settings for a plurality of different transmitter frequencies.

8. The method of claim 1, wherein obtaining crosstalk information comprises deriving the crosstalk information based upon a type of channel used to provide the channel, the type of channel comprising at least one of a cable type and a connector type.

9. The method of claim 1, wherein obtaining crosstalk information comprises deriving the crosstalk information based upon a type of channel used to provide the channel, and a type of channel used to provide the other channels of the network, the type of channel comprising at least one of a cable type and a connector type.

10. The method of claim 1, wherein obtaining crosstalk information comprises receiving the crosstalk information from a system operator.

11. The method of claim 1, wherein obtaining channel loss information comprises receiving the channel loss information from a system operator.

12. The method of claim 1, wherein calculating the power backoff additionally includes factoring a known crosstalk margin relative to cable type crosstalk specifications.

13. The method of claim 1, wherein setting the power backoff comprises selecting one of plurality of power backoff settings, each power backoff setting having a different power spectral density.

14. The method of claim 1, wherein calculating the power backoff comprises accessing a look up table (LUT) that includes entries corresponding to a channel loss of the channel.

15. The method of claim 1, wherein the loss of the other channels includes a range of losses of the other channels.

16. The method of claim 1, wherein the losses of the other channels includes a maximum loss of the other channels.

17. The method of claim 1, wherein the losses of the other channels includes maximum and minimum losses of the other channels.

18. The method of claim 5, wherein calculating the power backoff comprises accessing a look up table (LUT) that includes entries corresponding to a channel length of the channel.

19. The method of claim 18, wherein the lengths of the other channels includes a range of lengths of the other channels.

20. The method of claim 18, wherein the lengths of the other channels includes a maximum length of the other channels.

21. The method of claim 1, further comprising updating the crosstalk information and the power backoff, based upon measurements of cross-talk between the channels.

22. The method of claim 1, wherein the channel loss of the channel includes a magnitude of insertion loss in a frequency domain, and the channel loss of other channels includes a magnitude of insertion loss of the other channels in the frequency domain.

23. The method of claim 22, wherein the magnitude of insertion loss in the frequency domain of the channel is approximated by at least one of a middle, mean or median value of the magnitude of the insertion loss in the frequency domain.

24. The method of claim 22, wherein the magnitude of insertion loss in the frequency domain of the other channels are approximated by at least one of a middle, mean or median values of the magnitude of the insertion losses in the frequency domain.

25. The method of claim 22, wherein setting the power backoff comprises determining an insertion loss quality parameter comprising at least one of a mean of a log of insertion loss, a middle of the log of the insertion loss, a median of the log of the insertion loss.

26. The method of claim 22, wherein setting the power backoff comprises determining an crosstalk quality parameter comprising at least one of a mean of a log of crosstalk, a middle of the log of the crosstalk, a median of the log of the cross talk.

27. The method of claim 14, further comprising updating the LUT based upon system measurements of cross talk between the channels.

28. A transceiver within a network, comprising:
   a transmission channel;
   means for obtaining crosstalk information between the channel and other channels of the network;
   means for estimating channel loss of the channel;

means for obtaining channel loss information for other channels of the network;

means for setting the power backoff based on the channel loss of the channel, the crosstalk information and a maximum channel loss of channel losses of the other channels of the network, wherein setting the power backoff additionally includes factoring a type of channel used to provide each of the channels of the network, the type of channel comprising at least one of a cable type and a connector type, and factoring a procedure for installing of each of the channels of the network, wherein separate LUTs are provided for each of a plurality types of channels of the network, and separate LUTs are provided for each of a plurality types of installation procedures of the network.

29. The transceiver of claim 28, comprising setting the power backoff based on a range of channel losses of the other channels of the network.

30. The transceiver of claim 28, comprising setting the power backoff based on a maximum channel loss and a minimum channel loss of the other channel losses of the other channels of the network.

31. The method of claim 28, wherein the channel loss information includes channel lengths of the other channels of the network.

32. A method of setting transmit power backoff of a transceiver within a network, comprising:

estimating a channel length of a channel of the transceiver;

obtaining channel length information, the channel length information comprising estimates of channel length of other channels of the network;

obtaining crosstalk information, the crosstalk information comprising estimates of crosstalk between the channel and other channels of the network;

setting the power backoff based on the channel loss of the channel, the crosstalk information, and a maximum channel loss of channel losses of the other channels of the network, wherein setting the power backoff additionally includes factoring a type of channel used to provide each of the channels of the network, the type of channel comprising at least one of a cable type and a connector type, and factoring a procedure for installing of each of the channels of the network, wherein separate LUTs are provided for each of a plurality types of channels of the network, and separate LUTs are provided for each of a plurality types of installation procedures of the network.

33. The method of claim 32, wherein setting the power backoff for the channel comprises:

setting the power backoff based on a range of channel losses of the other channels of the network.

34. The method of claim 32, wherein obtaining channel length information comprises receiving channel loss information from a system operator.

35. A method of setting transmit power backoff of a transceiver, comprising:

estimating a channel loss of a channel of the transceiver;

obtaining channel loss information, the channel loss information comprising estimates of channel loss of other channels that receive crosstalk from the channel;

obtaining crosstalk information, the crosstalk information comprising estimates of crosstalk between the channel and the other channels that receive crosstalk from the channel;

setting the power backoff based on the channel loss of the channel, the crosstalk information, and a maximum channel loss of channel losses of the other channels of the network, wherein setting the power backoff additionally includes factoring a type of channel used to provide each of the channels of the network, the type of channel comprising at least one of a cable type and a connector type, and factoring a procedure for installing of each of the channels of the network, wherein separate LUTs are provided for each of a plurality types of channels of the network, and separate LUTs are provided for each of a plurality types of installation procedures of the network.

36. A method of setting transmit power backoff of a transceiver, comprising:

estimating a channel loss of a channel of the transceiver;

obtaining channel loss information, the channel loss information comprising estimates of channel loss of other channels that channel receives crosstalk from;

obtaining crosstalk information, the crosstalk information comprising estimates of crosstalk between the channel and the other channels that receive crosstalk from the channel;

setting the power backoff based on the channel loss of the channel, the crosstalk information, and a maximum channel loss of channel losses of the other channels of the network, wherein setting the power backoff additionally includes factoring a type of channel used to provide each of the channels of the network, the type of channel comprising at least one of a cable type and a connector type, and factoring a procedure for installing of each of the channels of the network, wherein separate LUTs are provided for each of a plurality types of channels of the network, and separate LUTs are provided for each of a plurality types of installation procedures of the network.

* * * * *